United States Patent [19]

Giebel et al.

[11] Patent Number: 4,707,200
[45] Date of Patent: Nov. 17, 1987

[54] WRAP FOR FILLING CAVITIES, PARTICULARLY IN CABLE FITTINGS, WITH INSULATING COMPOUND AND A METHOD FOR FILLING THE CAVITIES

[75] Inventors: Wolfgang Giebel, Planegg; Heinrich Meixner, Halfing, both of Fed. Rep. of Germany

[73] Assignee: Siemens Aktiengesellschaft, Berlin and Munich, Fed. Rep. of Germany

[21] Appl. No.: 865,435

[22] Filed: May 21, 1986

[30] Foreign Application Priority Data

May 24, 1985 [DE] Fed. Rep. of Germany ....... 3518815

[51] Int. Cl.⁴ ............................................ H01B 13/08
[52] U.S. Cl. ......................................... 156/48; 156/49; 156/54; 156/185; 206/616; 206/633; 206/813; 229/3.5 R; 229/87 R; 428/320.2
[58] Field of Search ................ 156/48, 49, 54, 185; 206/616, 633, 813; 229/3.5 R, 87 R; 428/320.2

[56] References Cited

U.S. PATENT DOCUMENTS

| | | | |
|---|---|---|---|
| 3,297,819 | 1/1967 | Weimore | 156/49 X |
| 3,454,210 | 7/1969 | Spiegel et al. | 206/633 X |
| 3,754,070 | 8/1973 | Dunn et al. | 156/48 X |
| 4,251,712 | 2/1981 | Parr | 206/813 X |
| 4,519,866 | 5/1985 | Stol | 206/813 X |

OTHER PUBLICATIONS

Siemens publication "Garnituren für Starkstromkablel 1 bis 30kV", Order No. A19100-J11-A27.

Primary Examiner—Robert A. Dawson
Attorney, Agent, or Firm—Hill, Van Santen, Steadman & Simpson

[57] ABSTRACT

The present invention is directed to a wrapper for surrounding an object such as a cable splice to form a cover or envelope containing an insulating compound characterized by a film having adhesive along two lateral edges for securing the film onto the object to form an enveloping cavity. The film has a container of a predetermined amount of the insulating compound which container is opened during the operation of wrapping the film onto the object so that upon completion of the wrapping, the container can be kneaded externally through the cover or envelope to remove the compound from the container and to knead the compound into the spaces and cavities of the object. Subsequently, additional layers such as a foil layer and a heat shrinkable protective sheath can be applied to the cover.

21 Claims, 9 Drawing Figures

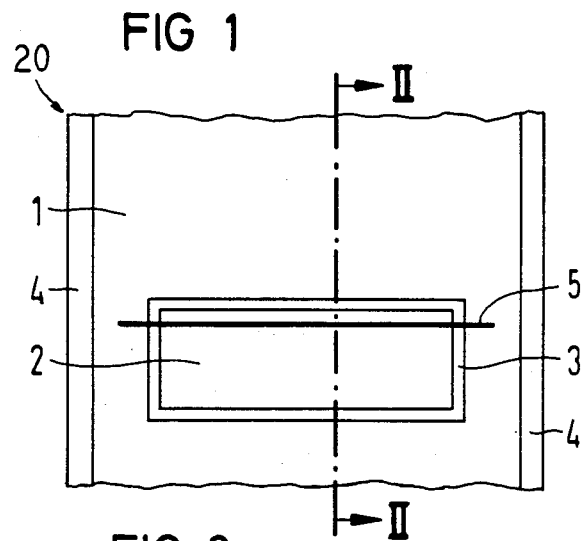
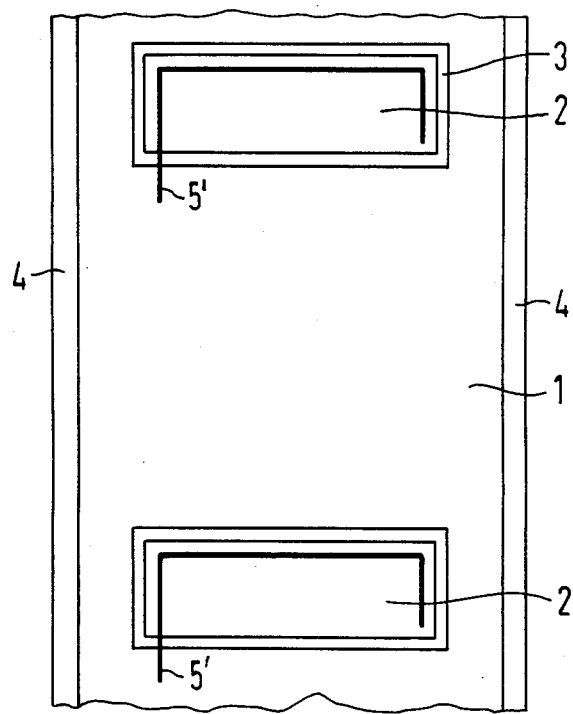

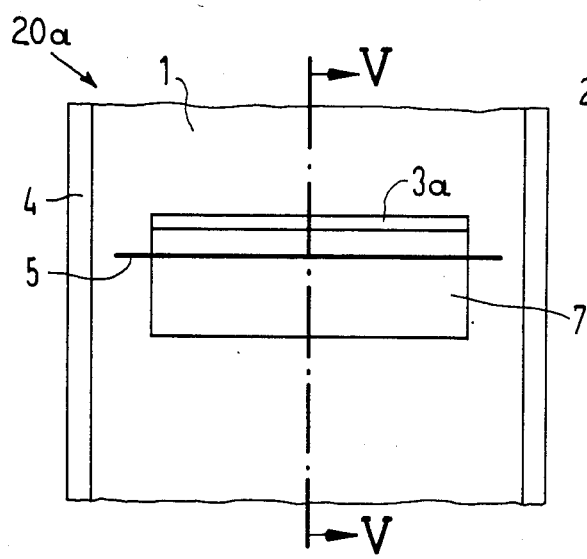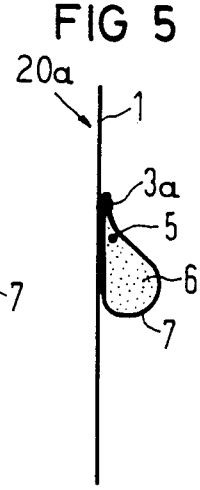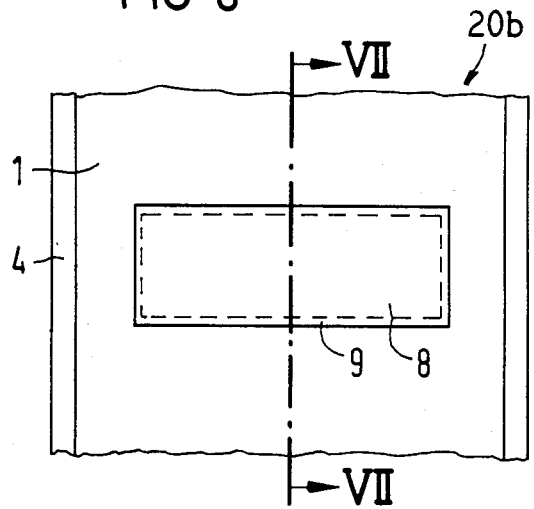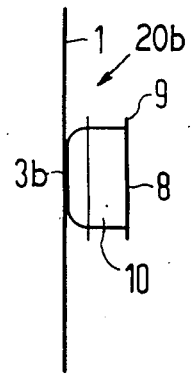

WRAP FOR FILLING CAVITIES, PARTICULARLY IN CABLE FITTINGS, WITH INSULATING COMPOUND AND A METHOD FOR FILLING THE CAVITIES

BACKGROUND OF THE INVENTION

The present invention is directed to a wrapper or device for filling cavities, particularly in cable fittings, with an insulating compound for protection against moisture.

From a Siemens company publication "Garnituren Für Starkstromkabel 1 bis 30 kV" Order No. A19100-J11-A27, it is known that sealing compounds or respectively insulating compounds can be introduced into cavities in cable sockets and into the spaces or gores between the cable leads as well. This is accomplished by the insulating compound being easily kneaded by hand into these cavities and/or spaces. Since the insulated compound is extremely adhesive, this procedure is not very pleasant without auxiliary means and requires dexterity. Methods for filling cavities with the assistance of two-component resins are also specified in this publication. However, these resins are relatively expensive and require special molds so that they can only be employed in special use cases having very high demands.

SUMMARY OF THE INVENTION

The object of the present invention is to create an device or wrapper with whose assistance a simple insulating compound can be introduced into the cavities in an application friendly way. This object is achieved with a wrapper of the present invention which is wound around the object such as a cable to form a cover and to present the insulating compound for filling the cavity. The wrapper includes a mounting film having a pair of lateral edges, an adhesive coating being applied to one surface of the film along each of the lateral edges and a flexible container being secured to the one surface between said edges and containing a predetermined quality of the insulating compound. The wrapper is thus wound or wrapped around an object with the adhesive edges bonding to the object at the ends to form the cover and then the insulating compound is expelled through the means for forming an opening in the container. This compound is thus entrapped by the cover.

A further object of the invention is to provide a method for filling the cavities wherein the wrapper of the invention is employed. This second object is achieved in accordance with the invention in that the mounting film with the adhesive is secured to the lateral limitations of the cavity to be filled to form a terminating cavity envelope and the container containing the insulating compound is opened by the means for forming an opening so that the compound can emerge from the container and be kneaded into the cavities from outside with the assistance of the enveloping mounting film and subsequently it is preferred to apply a shrinkable, protective sleeve on to the cover formed by the wrapper.

One advantage of the invention is that the insulating compound, which is extremely adhesive per se, can be kneaded into the cavity without direct contact therewith, and therefore in a particular application-friendly way. Another advantage is that the expensive molds are not necessary and can be eliminated in this way. The method can be executed merely with the assistance of a simple, prefabricated plastic film or wrapper. Given the employment of the transparent mounting film, it is particularly advantageous that the cavities are completely filled with the insulating compound because the cavities filled with the compound can be seen through the transparent film.

Additional envelopes, which meet the requirements can be applied over the cover formed by the wrapper or mounting film. Thus a metal foil can be applied to the cover as a further layer for permeation protection as well as a heat distributing or dissipating element. This metal foil layer is then provided with a protective sheathing, for example with a shrinkable protective sheath.

In order to further improve the application friendliness of the wrapper the insulating compound is accommodated in a special container which is connected to the mounting film and can be opened with a simple opening means for releasing the insulating compound. Premature contact with the insulating compound is thus prevented. In order to then prevent too much insulating compound from adhering to the container, the insulating compound is preferably formulated so that in a temperature range of $-10°$ C. through $+50°$ C., the cohesion between the compound is greater than its adhesion to the mounting film or respectively the container. In order to reduce the adhesion between the mounting film and the insulating compound the mounting film or respectively also the container can be treated with a special lubricant particularly with silicone before filling with the insulating compound.

Another advantage of the given present invention is that the mounting film for the wrapper can be fabricated in an endless fashion so that the respectively required lengths for the mounting film can be cut off. The mounting film, of course, can also be fashioned as a composite foil, which is composed of a plurality of layers of different materials and correspondingly meets the various requirements. An advantage is also derived from the fact that transparent films and transparent compounds are employed. Thus the processing operation can be observed in a particularly good fashion.

The method for filling cavities with the assistance of the wrapper of the present invention particularly in the case of cable splices begins in that the wrapper composed of the mounting film containing the container with the insulating compound is laterally secured to the lateral limitations of the cavity to be filled. Thus, the edges having the adhesive are joined to the object such as the ends of the cable and the film is wrapped or wound therearound to form a cover or an envelope surrounding the compound. Just before the final wrapping of the film, the container, which is on an inner surface of the film, is opened so that the insulating compound can be subsequently kneaded out of the container and into the cavity. Thus after completion of the wrapping to form the cover, the insulating compound can be subsequently kneaded out of the container and into the cavity formed by the envelope or cover material by manipulation from outside of the mounting film. After this kneading operation has been concluded, further protective sheaths or layers can be applied as needed, for example a shrinkable protective sheath can be applied in a particular simple fashion. Additional advantages with the application of a shrinkable protective sheath are that the insulating compound is distributed with particular uniformity. The individual protective sheath meets the various requirements, such as protection against permeation or heat and can be applied either in layers or in common as a compound foil.

BRIEF DESCRIPTION OF THE DRAWINGS

FIG. 1 is a plan view of a wrapper in accordance with the present invention;

FIG. 2 is a cross sectional view taken through lines II—II of FIG. 1;

FIG. 3 is a plan view similar to FIG. 1 showing a continuous sheet forming a plurality of wrappers;

FIG. 4 is a plan view of an embodiment of the wrapper of FIG. 1;

FIG. 5 is a cross sectional view taken along lines V—V of FIG. 4;

FIG. 6 is a plan view of another embodiment of the wrapper of the present invention;

FIG. 7 is a cross sectional view taken along lines VII—VII of FIG. 6;

DESCRIPTION OF THE PREFERRED EMBODIMENTS

Figure 8:
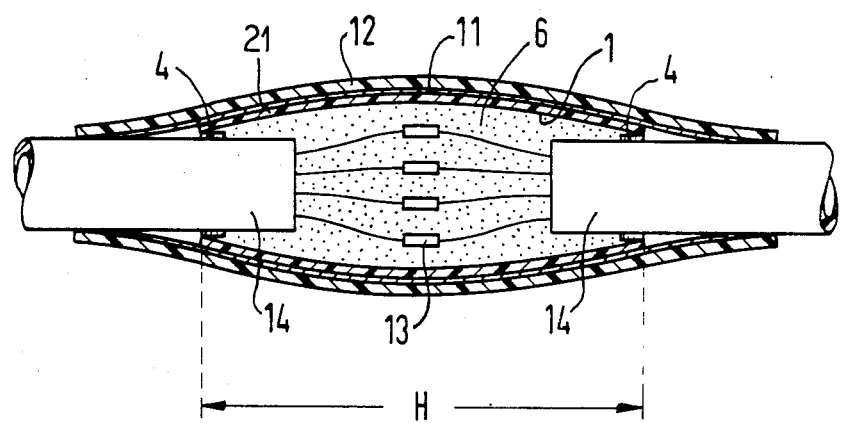
FIG. 8 is a cross sectional view with portions in elevation for purposes of illustration of a cable splice which is enveloped with a cover formed by the wrapper of the present invention.

The principles of the present invention are particularly useful when incorporated in a wrapper generally indicated at 20 in FIGS. 1 and 2. The wrapper 20 includes a mounting film 1, which is cut to an appropriate length which is based on the diameter or size of the article to be enveloped with the wrapper 20. The film 1 of the wrapper 20 along lateral edges on one surface is provided with strips 4 that are self-adhering and formed by adhesive coatings. The strips 4 enable the film 1 to be secured at both ends as it is wrapped or wound around an object which is to be enveloped. For example, when enveloping a cable slice, the mounting film 1 is placed around the portion of the slice which is to be filled with the compound and the film has its lateral adhesive strips 4 secured to the cable ends.

Before the mounting film 1 is completely wrapped around the cable splice, a container 2, which is carried on the inner end surface facing the cable, is opened with the assistance of means for opening, which is illustrated in FIGS. 1 and 2 as being a tear element or rip thread 5. Then the insulating compound 6 contained within the container 2 can be kneaded from the container. As illustrated, the container 2 is also formed as a portion of film which is glued or bonded to the mounting film 1 along a peripheral edge 3. The insulating compound 6, which is to be kneaded into the cavities of the cable splices, is situated in the container. After completing of the wrapping or winding of the wrapper 20 around the splice, the compound will be kneaded from the container and kneaded into the spaces between the elements of the cable splice by kneading the cover formed by the wrapped around film 1.

Preferably the mounting film 1 can be fabricated as a continuous sheet as illustrated in FIG. 3. This continuous sheet will have a plurality of containers 2' secured to it at the desired spacing so that the interval between the container 2' is such that the material of the film 1 lying between two adjacent containers is sufficient to envelope the common object of which the wrapper 20 is designed to enclose. The strips 4 are also continuously applied along the two lateral edges and may be adhesive strips or burr strips. If they are adhesive strips, they are initially covered with a protective tape or sheet. In this exemplary embodiment, the means for forming the openings for the containers 2' are tear open elements 5' which are U-shaped rip thread so that upon ripping the thread 5' from the container, the container 2' will be opened on approximately three sides to improve the emergence of the insulating compound 6 therefrom. Upon exploitation of a greater cohesion between the insulating compound and the material of the container, a removal of a portion of the film forming the container in the manner of removing a lid from "a sardine can" can also be carried out, then all four sides of the containers are opened by means of a tear element that extends around the periphery of the container.

An embodiment of the wrapper is illustrated at 20a in FIGS. 4 and 5 and includes the film 1 having the strips 4 of adhesive material along two lateral edges. In this embodiment, container 7 is formed as a separate bag. The container 7 is fastened along a closing edge 3a by bonding the bag to the film 1. As in the previous embodiment, means for forming an opening comprising a tear element 5 which is formed by a straight rip thread is provided in each of the containers 7. The work sequence with this modification of the apparatus occurs in a fashion already set forth. As indicated in FIG. 5, the bag-shaped containers 7 with the insulated compound 6 embedded therein have a tear drop shape with the edge 3a being the edge securing the bag to the surface of the film 1.

Another exemplary embodiment of the wrapper is generally indicated at 20b in FIGS. 6 and 7. The wrapper 20b has a container 10 which is cup-shaped and is provided along an upper edge 9 with a tear open cover 8. The cover 8 is in turn bonded to the edge 9 of the container 10 in a known way and, for example, has a lug with whose assistance the cover 8 can be pulled off the edge 9 before completing the wrapping of the wrapper 20b around a splice. The container 10, as illustrated in FIG. 7, is secured by a secure line 3b to the one surface of the film 1. As in the previous embodiments, the film 1 has adhesive strips 4 along the lateral edges.

The wrapper of the present invention is particularly useful for encapsulating or enclosing a cable splice such a cable splice 13 (FIG. 8) lying between two cable ends 14. The film 1 of one of the wrappers is wrapped around the two ends with the adhesive strips 4 connecting the film 1 to the ends of the cables 14 to form a cover 21 with a cavity or chamber having a length H which is to be filled the insulating compound. The insulating compound 6 has been kneaded from the container 2 which is not illustrated in FIG. 8, by kneading the cover 21 from the outside. The compound can be kneaded continuously in and around the cable splices 13 without the insulating compound having to emerge towards the outside in a disturbing way. An undesireable sticking or contamination due to this insulating compound is thus prevented in this fashion. After the kneading-in operation, which can be easily observed because of the transparent mounting film, is concluded, additional protective sheets can be applied. It is also recommended, for example, to apply a compound distributing or compression coil. This compresion coil preferably manufactured of a self-sticking plastic tape so that a yielding cannot occur giving the pressure increases due to the winding operation. The compound is also thus pressed into the cable.

In the illustrated exemplary embodiment, a metal foil layer 11 is subsequently applied to the cover 21 as a further permeation and heat barrier. In turn this metal foil layer 11 is surrounded by a shrunken-on protective sheath 12 which may be a heat shrinkable sleeve. The production of the filled cable splice has thus been concluded.

Figure 9:
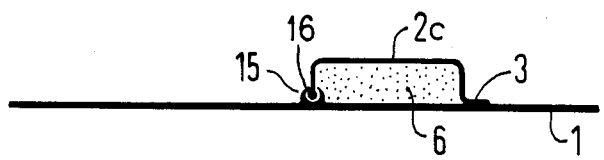
FIG. 9 is a cross sectional view of yet another embodiment of the wrapper in accordance with the present invention.

Another exemplary embodiment of the invention has the means for forming an opening comprising pressure closure elements as illustrated in FIG. 9. In this embodiment, a container 2c along at least one edge is provided with a bead 16 which is received in a closure groove or lock 15 which has an undercut configuration. The closure form by the bead 16 and the groove 15 is illustrated as being provided along one edge; however, it could also be formed as a strip operning as well as a contour opening across a portion of the container 2c. Such a closure can also be fashioned in a manner of a snap-in closure wherein the two corresponding latch elements are engaged in one another with the assistance of pressure elements such as in a zipper. This opening means in the form of such as closure is particularly advantageous because they can be manufactured of the same material as the container and/or the mounting film namely in the same operation. Another advantage is that a rip thread is not necessary. In addition, the closures based on the principles of a known burr closure or closures with the assistance of contact adhesive surfaces can also be utilized.

The appropriate exemplary embodiments can be selected depending of the mechanical stresses and the required tightness during warehousing or storage.

The materials concerned can be described as follows for example:

The film 1 of FIG. 1 can be a transparent polyvinylchloride (PVC) and has the advantage of being polar with good adhesive properties, but the disadvantage of having a high permeability. More cost intensive are transparent polyethyleneterephthalates or a polyamides to avoid the problems of high permeability. Laminated films can also be used to provide polarity on the outside and low permeability on the inside.

For the adhesive 4 of FIG. 1, since only a short time function of the adhesive is required, a butyl band works sufficiently. Possible additions like polyisobutylene will improve the functionability. Acrylate systems can be used for this purpose and are common on the market.

For the insulating compounds 6 of FIG. 2, a non-curing system with or without thixotropic behavior can be used. In this case, the compound consists of microcrystalline waxes and paraffinic oils. Alternatively, in order to optimize adhesiveness and viscosity (strength), polyisobutylene and/or atactic polypropylene can be used or added. Oxidation stabilizers, such as phenolic or aminic oxidation inhibitors have to be used and are introduced according to the insulation material of the wires. A curing system where two components have to be mixed on site on the basis of polyurethane can also be introduced.

Although various minor modifications may be suggested by those versed in the art, it should be understood that we wish to employ within the scope of the patent granted hereon, all such modifications as reasonably and properly come within the scope of our contribution to the art.

We claim:

1. A wrapper for being wound around an object to form a cover for enveloping the object such as a cable splice to maintain an insulating compound in and around the object to protect it against moisture, said wrapper including a length of mounting film having a pair of lateral edges, a strip of adhesive material on one surface of the film adjacent each of the lateral edges and a flexible container being secured to said one surface between said strips, said container having means for forming an opening and containing a predetermined quantity of insulating compound so that as the wrapper is wound around the object, the container can be opened and to enable forcing the compound from the container by kneading the exterior surface of the film after completion of the winding of the wrapper onto the object.

2. A wrapper according to claim 1, wherein the insulating compound is composed of a kneadable plastic material.

3. A wrapper according to claim 1, wherein the container is formed by bonding a piece of film onto the one surface of the mounting film.

4. A wrapper according to claim 1, wherein the means for forming an opening comprises a tear element preferrably a rip thread.

5. A wrapper according to claim 1, wherein the container is a separate bag secured to the one surface of the mounting film.

6. A wrapper according to claim 1, wherein the container is an individual cup shape unit having a removable cover secured to an upper edge of the unit.

7. A wrapper according to claim 1, wherein the means for opening the container is constructed as pressure activated closure element.

8. A wrapper according to claim 1, wherein the adhesive along each of the lateral edges of the mounting film is applied as a self-sticking strip of adhesive.

9. A wrapper according to claim 1, wherein said mounting film is transparent.

10. A wrapper according to claim 9, wherein the insulating compound is a transparent material.

11. A wrapper according to claim 1, wherein an outer surface of the mounting film is provided with a metal foil layer.

12. A wrapper according to claim 1, wherein the mounting film is a composite film composed of a plurality of different layers.

13. A device for enveloping an object such as a cable splice, said device including a wrapper having a mounting film having a pair of lateral edges, a strip of adhesive being applied to one surface of the film along each of the lateral edges, and a flexible container being secured to said one surface, said container having means for forming an opening and containing a predetermined quantity of insulating compound, said wrapper being wound around the object with the adhesive layer adjacent each edge being secured to the object to form a cover with a tight enclosure, so that subsequent to the winding, kneading of the film of the wrapper can knead the compound from the container and into cavities and spaces of the object.

14. A device according to claim 13, which further includes a metal foil layer covering the outer surface of the cover formed by the wrapper.

15. A device according to claim 14, which includes a shrinkable protective sheath surrounding the cover and metal foil layer.

16. A device according to claim 13, wherein the mounting film is a composite film composed of a plurality of layers of different materials.

17. A device accoridng to claim 16, which includes a shrinkable protective sheath surrounding the cover formed by the wrapper.

18. A device according to claim 13, which includes a compression coil preferrably composed of self-sticking plastic tape being wound around the cover.

19. A method for filling cavities particularly in a cable splice comprising the steps of providing a wrapper having a mounting film with lateral edges, strips of adhesive material along each of the lateral edges on one surface, a flexible container being secured to said one surface, said container having means for forming an opening and having a predetermined quantity of insulating compound, securing the wrapper on the cable splice as a cover by winding the mounting film around the object with the adhesive along the lateral edges securing the film at the edges to form an enveloping cavity for the cover, prior to completing the winding of the film, opening the means for forming an opening and then completing the winding of the film to complete the cover, subsequently kneading the container and the wrapper to knead the compound from the container and into the spaces in the cavities of the cable splice being surrounded by the cover.

20. A method according to claim 19, which further includes subsequent to kneading the compound into the spaces and the cavities of the object, providing a shrinkable protective sheath over the cover and shrinking the sheath thereon.

21. A method according to claim 16, which further includes subsequent to kneading the compound into the spaces and cavities, wrapping a foil layer around the cover, then providing a shrinkable protective sheath over the foil layer and subsequent shrinking the sheath onto the foil layer.

* * * * *